July 31, 1956  C. V. HANSON ET AL  2,756,951
AIRCRAFT CONTROL MECHANISM

Filed Aug. 22, 1955  2 Sheets-Sheet 1

Donald W. Finlay &
Carl V. Hanson
INVENTORS.

BY *[signature]*

ATTORNEY.

Donald W. Finlay &
Carl V. Hanson
INVENTORS.

BY James M. Clark

ATTORNEY.

United States Patent Office 2,756,951
Patented July 31, 1956

2,756,951

AIRCRAFT CONTROL MECHANISM

Carl V. Hanson, Renton, and Donald W. Finlay, Seattle, Wash., assignors to Boeing Airplane Company, a corporation of Delaware Application August 22, 1955, Serial No. 529,704

8 Claims. (Cl. 244—75)

The present invention relates to the control surfaces of aircraft and more particularly to improved means and mechanism for damping and opposing movements of a control surface beyond predetermined extents.

This invention is directed to an improved mechanism which permits free and unopposed movement of a control surface up to a predetermined angle in either direction and beyond that deflection it resiliently opposes and dampens further movement. The improved mechanism is particularly applicable to those aircraft in which the control surfaces are not locked when parked upon the ground and accordingly relieves the pilot of the additional operation of unlocking the control surfaces prior to take-off. With the present mechanism, when the airplane is on the ground, gusts sufficiently great to cause more than a predetermined airfoil deflection automatically bring into operation a linkage assembly and an associated snubber assembly to dampen and oppose the excessive movement to thereby avoid any damage to the airfoil or adjacent structure. The damping is accomplished by a single snubbing assembly actuated by surface movement in either direction. When the airplane is airborne, similar deflections up to the predetermined angle referred to are unaffected by the snubbing mechanism. Deflections of the surface beyond the predetermined angle cause the snubbing mechanism, or gust lock, to be brought into operation, although during controlled movements of the airfoil beyond the predetermined angle, this snubbing action is readily overcome by the pilot without difficulty. This snubbing action and the resilient opposition to actuation of the airfoil beyond the predetermined angle, particularly in power boost systems, is effectively utilized during flight to provide the pilot with suitable "feel."

The improved mechanism comprising the means for damping the excessive movements of the control surface consist essentially of a pair of hook-like lever members pivotally mounted to have their contact ends projecting in an opposed manner with an intermediate space in which is operable a member projecting forwardly from the nose of the control surface. The spacing of the contact ends of the lever members permits limited angular movement of the control surface without opposing snubbing action, and the two lever members are interconnected by suitable double-acting linkage to a single common hydraulic snubber unit. The latter may be pivotally mounted upon the fixed wing structure in such an arrangement that when the predetermined angular limit is exceeded by the control surface movement, in either direction, the snubber unit is brought into play to damp further movement for the protection of the control surface and also to provide pilot "feel" in the system during flight.

It is, accordingly, a primary objective of the present invention to provide an improved mechanism for damping or snubbing both controlled and uncontrolled movement of a control surface beyond predetermined angles in either direction from the neutral position. It is a corollary objective to provide such a mechanism which is the equivalent of a gust lock when the aircraft is parked upon the ground, but which eliminates the objectionable feature of most gust lock arrangements in which the attention of the pilot is required to lock or unlock the control surfaces upon landing or taking off. It is a similar objective of the present invention to provide improved mechanisms of this nature which also snubbingly oppose deflection of the airfoil during flight beyond predetermined angles in either direction with an opposing force which is overcome without difficulty but which is effectively utilized by the pilot to provide suitable "feel" within the control system. Another object is the provision of a double-acting linkage which transmits surface movement in either direction to a single snubbing means. Other objects reside in both the general arrangement of the components of the improved mechanism as well as in the details of their respective parts.

Other objects and advantages of the present invention will become apparent to those skilled in the art following the reading of the accompanying description, taken in conjunction with the drawings herewith, in which.

Figure 1:
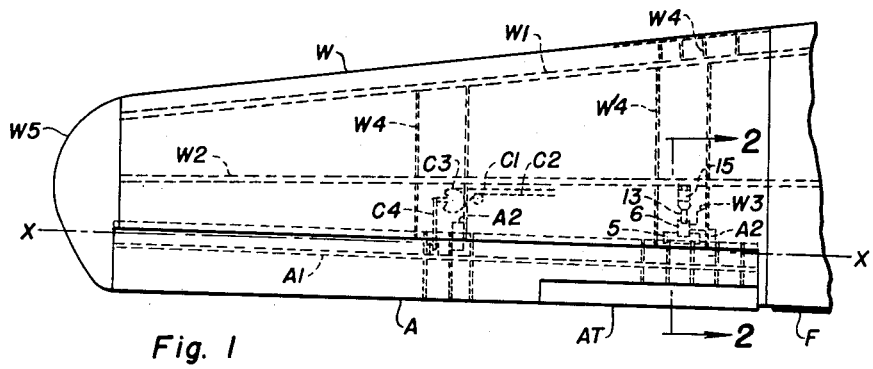
Fig. 1 is a plan view of the outer portion of an aircraft wing to which a preferred form of the present invention has been applied.

The wing shown in Fig. 1 is designated by the letter W, having a leading edge spar W1 and a rear spar W2, with a plurality of chordwise extending ribs or bulkheads W4 and a wing tip structure W5. An aileron A is pivotally mounted at the trailing edge of the wing W toward its outboard portion, having a main spar A1, and may be provided along its trailing edge with a conventional inset trim tab At. From the wing structure W there are provided a plurality of rearwardly extending aileron hinge brackets A2 from which the aileron A is pivotally mounted and adapted to rotate about the spanwise axis X—X, as well as a bracket support W3 for the improved gust snubbing mechanism. For purposes of describing the invention, the improved mechanism has been applied to an aileron, but it will be apparent that it is equally applicable to other control surfaces. The aileron A may be actuated by conventional control mechanism from the pilot cockpit such as indicated by the control cables C1 and C2 running to the control sector or segment C3 operatively connected to the push-pull rod C4 which in turn is pivotally connected to the aileron. The wing W may also be provided at its trailing edge, along the portion inboard of the aileron A, with a conventional trailing edge flap F.

Figure 2:
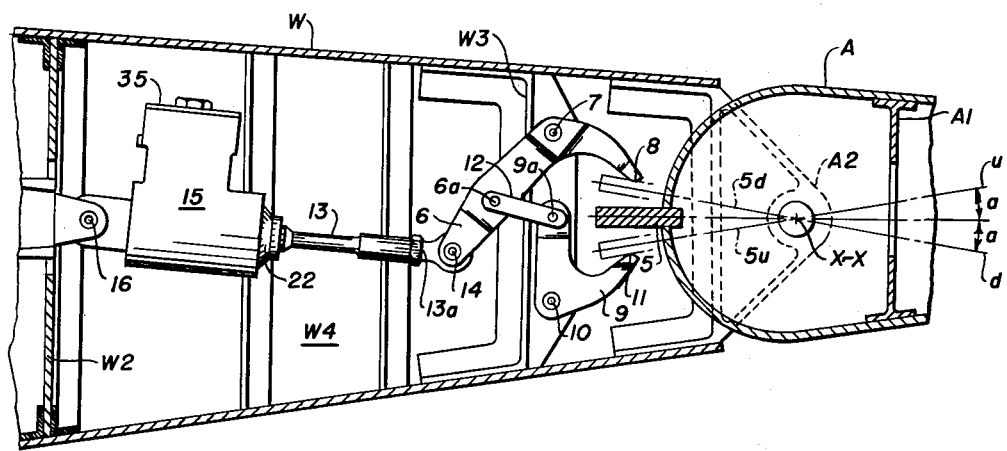
Fig. 2 is a transverse sectional view to an enlarged scale of the improved aileron snubbing mechanism mounted upon the wing shown in Fig. 1 as taken along the lines 2—2 thereof, with the aileron in the neutral position.
Figure 3:
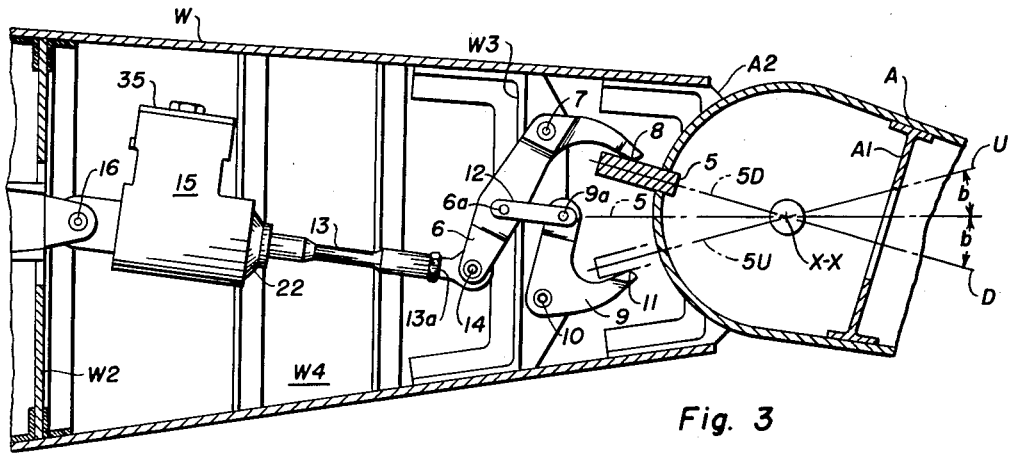
Fig. 3 is a similar view with the aileron deflected downwardly.

Referring now more particularly to Figs. 2 and 3, the aileron A is provided at its leading edge with a forwardly extending plate 5 fixed to move upwardly or downwardly with the aileron leading edge as it is deflected about its pivotal hinge axis X—X. The wing W is provided adjacent its trailing edge with the above-mentioned fixed bracket W3 upon which is pivotally mounted the bellcrank lever 6 at the pivot 7 carried by the bracket W3. The lever 6 in its neutral position has the longer of its two arms extending downwardly and forwardly from the intermediate pivot 7 and the shorter of its arms extending rearwardly and downwardly terminating in a rounded finger or contact portion 8. A lower and smaller bell-crank lever 9 is pivotally mounted upon the lower portion of the bracket W3 at the pivot 10 and has one of its legs or arms extending upwardly substantially vertically in the neutral position and its other leg extending rearwardly and upwardly to a position at which its contact finger 11 is disposed beneath the upper finger 8 and a like distance below and symmetrically therewith in respect to the intermediate plate 5. By symmetrically is meant in this connection, equally above and below the neutral position of the plate 5 as shown in Fig. 2 with the contacting portions 8 and 11 equidistant from the axis of rotation X—X of the control surface. The longer arm of the lever 6 is pivotally connected at a point intermediate its pivot 7 and the end of that arm by means of a link 12 pivotally connected at 6a to the upper terminal of the vertical arm of the lower lever 9 at its pivot 9a. The lower forward terminal of the lever 6 is pivotally connected by the pivot 14 to the single-acting snubber assembly 15 which in turn is pivotally mounted at the pivot 16 to the rear spar W2 of the wing. The pivots 7, 9a and 10 are preferably aligned in the neutral position with the axis at 9a in the mid-position. Similarly the curved portions of the arms 6 and 9 are equal in length, i. e., from pivot 7 to contact 8, and pivot 10 to contact 11, and are opposite hand.

Figure 4:
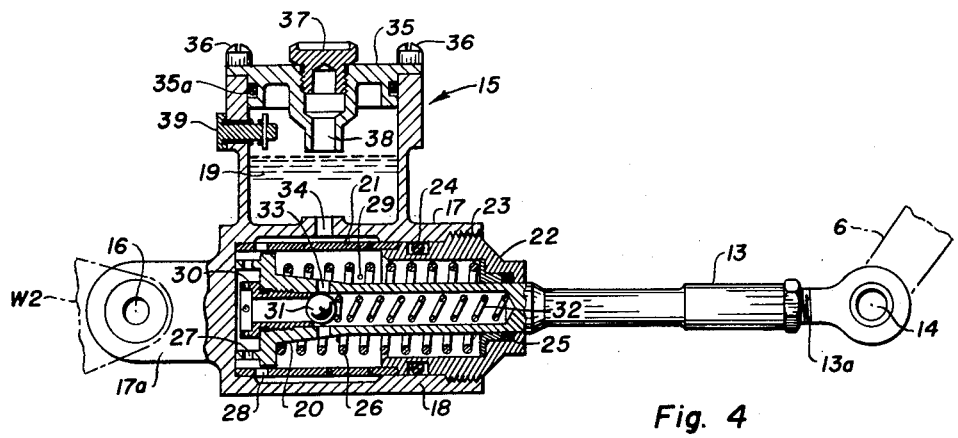
Fig. 4 is a detailed sectional view of the hydraulic damping mechanism.
Figure 5:
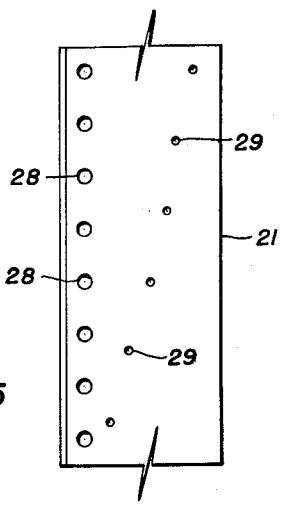
Fig. 5 is a developed view of the metering sleeve utilized therein.

Referring now to Figs. 4 and 5, the snubber assembly 15 consists essentially of a body or housing 17, having an integral apertured tongue portion 17a pivotally connected to the spar structure at the pivot 16, as well as having an integral cylinder portion 18 and a reservoir portion 19. The above-mentioned piston rod 13 is provided with a hollow piston or plunger portion 20 which is freely reciprocable within a cylindrical liner or sleeve 21 retained within the bore of the cylinder portion 18 by means of the gland 22, threadedly connected at 23 into the body of the snubber assembly 15. It will, accordingly, be noted that the gland 22 threaded into the cylinder portion 18 retains the liner 21 therein to form a bore of the cylinder for the head of the piston portion 20, the gland 22 being made pressure-tight within the cylinder portion by means of the O-ring seal 24, an additional seal 25 being provided at the opening where the hollow portion of the piston rod 13 passes through the gland 22. A compression spring 26 is interposed between the enlarged head portion of the hollow piston 20 and the gland 22 to resiliently oppose outward movement of the piston rod 13 from the body of the snubber assembly 15, or namely, movement of the piston rod rearwardly or to the right in Fig. 4. The enlarged head portion of the hollow piston 20 fits freely within the bore of the liner 21 and also has integrally formed on its head portion an annular spacing ring apertured at 27 to permit free flow of the shock absorber oil or other fluid with which the snubber is filled as it passes around the piston either into or out of its hollow portion. The liner or sleeve 21 is provided at its inner end adjacent the enlarged head portion of the hollow piston 20 with a plurality of circumferentially disposed apertures or orifices 28 and a series of relatively smaller apertures 29 progressively disposed closer to the opposite edge of the sleeve. These apertures serve as metering orifices as the piston is caused to move towards the right and gradually or progressively reduce the total area of the fluid being displaced from the interior of the sleeve to thereby gradually oppose further outward movement of the piston.

The hollow piston 20 is provided with a valve seat 30 which is threadedly retained therein and forms a seat for the ball check valve 31 which is urged into its closed position by the compression spring 32 housed within the hollow piston. A plurality of openings 33 are provided within the wall of the hollow piston adjacent the valve seat for the ball 31 to permit by-passing of the piston portion when the ball valve 31 opens during return or inward movement of the piston to the left as the control surface is returned towards the neutral position. The reservoir portion 19 of the snubber assembly 15 is filled with shock-absorber fluid to the level indicated in Fig. 4 and communicates with the working piston 20 in the cylinder 18 through the opening 34. It is closed or covered by the reservoir cap or plate 35 carrying the fluid seal 35a and retained upon the body by means of the attachment screws 36. A threaded plug 37 engages the reservoir cap 35 above the filler neck 38 through which the shock-absorber fluid is replenished and a suitable drain (not shown) may preferably be provided in the event drainage of the fluid is desired without removal of the cap 35. A suitable release valve 39 of the spring-pressed type is provided through the body of the reservoir portion above the normal filling level in order to relieve the interior or reservoir space of excessive pressures.

The operation of the improved mechanism is as follows: It will be noted by reference to Figs. 2 and 3 that deflection of the aileron A upwardly as indicated in Fig. 2 through an angle "a" to the upward position "u" can be made before the plate 5 engages the lower contact finger 11 and similarly that the aileron may be deflected downwardly through a like angle "a" to its downward position "d" before the plate 5 engages the upper contact finger 8. The permissible downward position of the plate 5 is indicated at 5u, corresponding to the upward position "u" of the aileron, and the opposite position of the plate 5 is designated at 5d, corresponding to the downward or "d" position of the aileron. These angles may be predetermined or established at any suitable displacement of the aileron to meet individual requirements and in a typical aileron installation have been designed to permit a free ten degree movement in each direction above and below the neutral position of the aileron before the plate 5 contacts either of the fingers 8 or 11, or a total angle of 20 degrees.

In Fig. 3, the aileron has been shown deflected downwardly to an extent slightly beyond the predetermined ten degree angle "a," in this case to approximately 15 degrees as indicated by the letter "b" such that the aileron extends downwardly or clockwise about X—X to the position D, and the plate 5 has moved upwardly pushing the contact finger 8 before the aileron attains the position indicated at 5D. As the upper lever 6 is thereby rotated in a counterclockwise direction about its pivot 7, and the plate 5 pushes the contact finger 8 before it, the forwardly extending longer arm of the lever moves rearwardly, drawing the piston rod 13 in the rearward direction by virtue of its pivotal connection at 14, and causing the hollow piston head portion 20 to move toward the right from the position shown in Fig. 4. The linkage mechanism comprising the two bell-crank levers 6 and 9 interconnected by the link 12 is such that when the aileron is deflected upwardly to the same extent to the position U, corresponding to the position 5U of the plate 5, the lower lever 9 is rotated in the clockwise direction about its pivot 10 and draws the downwardly and forwardly extending arm of the lever 6 rearwardly through the link interconnection 12, moving the pivot 14 and the attached piston rod 13 rearwardly. This rearward movement is made to the same extent that it is moved when the plate engages the upper contact finger 8 as the aileron is deflected downwardly to the same angular deflection.

Referring now to the hydraulic damping or snubbing mechanism of Fig. 4, as the piston rod is moved toward the right the fluid is displaced from the interior of the cylinder 18, being forced outwardly initially through the entire series of smaller apertures 29 to the exterior of the sleeve 21 from whence the fluid passes around to the other side of the piston through the large openings 28 and the opening 27 in the annular stop portion on the opposite face of the piston head. Due to the greater pressure within the cylinder portion inside the sleeve 21 the ball valve 31 remains closed assisted by the spring 32 such that the fluid displaced by the piston is either forced through the wall of the sleeve passing through the apertures 29 or leaks past the periphery of the piston as it slides along the bore of the sleeve. When the displacement of the aileron is caused by a gust which imparts deflection beyond the predetermined extent the excess movement is resiliently opposed and damped by the action of the snubbing assembly 15. This damping action or opposition to movement beyond the predetermined limit is progressively opposed both, by compression of the spring 26 and metering of the displaced fluid, and the movement of the control surface is cushioned and brought to a limit or stop before damage can be done either to the control system or to the control surface by striking adjacent structure. On the other hand, in the event the control surface is displaced by the pilot beyond the predetermined angle the forces opposing further deflection of the surface are readily overcome by the pilot and in doing so the required amount of "feel" is transmitted back to the control stick. Inasmuch as the rate at which the piston 20 is caused to move by pilot operation of the control surface is much lower than the rate at which the piston is caused to move by a sudden gust striking the surface, the snubbing effect is not as pronounced inasmuch as the metering of the fluid is more gradual and a greater portion of the opposition to piston movement is provided by the spring 26.

As soon as the force causing displacement of the control surface has been removed or is dissipated, the spring 26 returns the piston toward the left or to its initial position, drawing the piston rod and its pivotal connection 14 forwardly in the same direction and causing the contact fingers 8 and 11 to partially follow the plate 5 towards its neutral position and to return to their initially spaced inactive positions. As the pressure of the fluid is increased on the back side of the piston head portion, and reduced on its opposite face, the check valve 31 overcomes the spring 32 to open, and the rate of return is increased by displacement of the fluid through the valve opening 31, as well as outwardly through the openings 28 and back into the working chamber through the apertures 29. This serves to increase the rate with which the snubbing assembly is returned to its normal or initial neutral position at which it is again conditioned for the next displacement, whether pilot or gust initiated, and at which neutral position the valve 31 has again been closed so as to provide for build-up of pressure within the working portion of the chamber of the cylinder 18. The linkage 6—9—12 is accordingly double-acting and its movement in opposite directions by the surface plate 5 is translated into unidirectional movement for actuation of the single-acting snubber assembly 15. In effect it becomes a resilient hydraulically damped control surface stop which operates in either direction of rotation of the surface with a free unopposed intermediate region about the neutral position in which the movement of the surface is opposed only by the usual forces such as are created by the airstream, friction, etc.

Other forms and modifications of the present invention which will occur to those skilled in the art after reading the foregoing description, are intended to come within the scope and spirit of this invention as more particularly set forth in the appended claims.

We claim:

1. In aircraft, a gust damping system for a control surface mounted upon an aircraft component comprising a linkage assembly pivotally mounted upon the aircraft component including a pair of operatively interconnected levers, each of said levers having opposedly spaced portions engageable by the control surface, and a damping member operatively connected to one of said levers whereby movement of said control surface in either direction is dampingly opposed by said damping member upon engagement of the control surface with either of said levers.

2. In aircraft, a gust damping system for a control surface mounted upon an aircraft component comprising a linkage assembly pivotally mounted upon the aircraft component including a pair of operatively interconnected bell-crank levers, each of said levers having opposedly spaced portions engageable by the control surface, and a damping member operatively connected to one of said bell-crank levers whereby movement of said control surface in either direction is dampingly opposed by said damping member upon engagement of the control surface with either of said spaced portions of said bell-crank levers.

3. In aircraft, a gust damping system for a control surface, a linkage assembly pivotally mounted upon the aircraft including a pair of interlinked bell-crank levers, each of said levers having opposedly spaced portions alternately engageable by said control surface upon movement thereof, a damping member carried by the aircraft, said damping member having a portion pivotally connected to one of said bell-crank levers whereby movement of said control surface in either direction is dampingly opposed by said damping member upon contact of said control surface with either of said levers.

4. In aircraft, a gust damping system for a control surface operatively mounted upon an aircraft component comprising a protruding element carried by the nose portion of the control surface, a linkage assembly pivotally mounted upon the aircraft component including a pair of interlinked bell-crank levers, each of said levers having opposedly spaced contact portions alternately engageable by said projecting element upon movement in either direction of said control surface, a damping member carried by the aircraft component, said damping member having a movable portion pivotally connected to one of said bell-crank levers whereby movement of said control surface in either direction is dampingly opposed by said damping member upon contact of said protruding element with the respective contact portion of one of said levers.

5. In a stop device for a control surface mounted upon an aircraft wing, a resilient device supported upon the aircraft wing, a linkage assembly mounted upon the aircraft wing including a pair of separately mounted lever elements, a first of said bell-crank elements connected to said resilient device, said first lever element operatively connected to said second lever element, said lever elements having opposed portions engageable with said control surface upon deflection in either direction from its neutral position whereby said deflection is resiliently opposed and limited by said stop device.

6. In a stop device for a control surface mounted upon an aircraft wing, a resilient device supported upon the aircraft wing, a linkage assembly mounted upon the aircraft wing including a pair of separately mounted lever elements, a first of said bell-crank elements connected to said resilient device, said first lever element operatively connected to said second lever element, said lever elements having opposed spaced portions engageable with said control surface upon deflection beyond a predetermined angle in either direction from its neutral position whereby said excess deflection is resiliently opposed and limited by said stop device.

7. In a gust lock device for a control surface rotatively mounted upon an aircraft wing, a snubber device supported upon the aircraft wing and having a movable element, a linkage assembly pivotally mounted upon the aircraft wing including a pair of bell-crank elements, a first of said bell-crank elements pivotally connected to the said movable element of said snubber device, said first bell-crank element pivotally connected to said second bell-crank element, said bell-crank elements having opposed portions engageable with said control surface upon deflection beyond a predetermined angle in either direction from its neutral position whereby said excess deflection is opposed and limited by said gust lock device.

8. In a gust lock device for a control surface pivotally mounted upon an aircraft wing, control means for operating said control surface, a snubbing device supported upon the aircraft wing and having a movable element, a linkage assembly pivotally mounted upon the aircraft wing including a pair of separately pivotally mounted bell-crank elements, a first of said bell-crank elements pivotally connected to the said movable element of said snubber device, said first bell-crank element pivotally connected to a second bell-crank element, said control surface having an engagement portion, said bell-crank elements having opposed portions engageable with said control surface upon deflections beyond a predetermined angle in either direction from its neutral position, said opposed portions spaced on both sides of said control surface engagement portion to provide a lost-motion range of angular movement in which the control surface is unopposed by said device and feel is imparted to the control means for said control surface.

No references cited.